(12) United States Patent  
Lu et al.

(10) Patent No.: US 9,350,728 B2  
(45) Date of Patent: May 24, 2016

(54) METHOD AND SYSTEM FOR GENERATING AND AUTHORIZING DYNAMIC PASSWORD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/423,537

(22) PCT Filed: Aug. 30, 2013

(86) PCT No.: PCT/CN2013/082714  
§ 371 (c)(1),  
(2) Date: Feb. 24, 2015

(87) PCT Pub. No.: WO2014/040501  
PCT Pub. Date: Mar. 20, 2014

(65) Prior Publication Data  
US 2015/0207790 A1    Jul. 23, 2015

(30) Foreign Application Priority Data

Sep. 12, 2012    (CN) .......................... 2012 1 0337308

(51) Int. Cl.  
*H04L 29/06*    (2006.01)  
*H04L 9/32*    (2006.01)  
(Continued)

(52) U.S. Cl.  
CPC ............ *H04L 63/0846* (2013.01); *G06F 21/44* (2013.01); *G06F 21/46* (2013.01); *H04L 9/3228* (2013.01); *H04L 63/0838* (2013.01); *H04L 63/0853* (2013.01); *H04L 63/108* (2013.01)

(58) Field of Classification Search  
CPC .................................................. H04L 63/0846  
See application file for complete search history.

(56) References Cited

U.S. PATENT DOCUMENTS 5,694,539 A * 12/1997 Haley .................... G06F 11/366  
　　　　　　　　　　　　　　　　　　　　714/38.1  
6,311,276 B1 * 10/2001 Connery .................. G06F 1/26  
　　　　　　　　　　　　　　　　　　　　726/13

(Continued)

*Primary Examiner* — Eleni Shiferaw  
*Assistant Examiner* — Alexander Lapian  
(74) *Attorney, Agent, or Firm* — Hammer & Associates, P.C.

(57) ABSTRACT

A method and system for generating and authorizing a dynamic password, which relate to the field of identity authentication. The method comprises: a token receiving a command for generating a dynamic password, and generating a first dynamic factor according to a first timer; acquiring current data from a first data set according to a first offset pointer, and generating a first dynamic password according to the first dynamic factor and the current data; a server receiving a second dynamic password input by a user, and obtaining a second dynamic factor according to a second timer; obtaining an authentication window according to the second dynamic factor and an authentication window value; and according to the dynamic factor in the authentication window and the data in a second data set, calculating to generate a group of dynamic passwords, and verifying whether there is a dynamic password consistent with the second dynamic password in the group of dynamic passwords or not. With the above-mentioned solution, the problem that a time-type token cannot be generated a plurality of times within a short time is solved, and that the situation where the event-type token causes desynchronization with the server because of continuous generation of dynamic passwords is avoided.

18 Claims, 4 Drawing Sheets

(51) Int. Cl.
*G06F 21/46* (2013.01)
*G06F 21/44* (2013.01)

(56) References Cited

U.S. PATENT DOCUMENTS

| | | | | |
|---|---|---|---|---|
| 6,607,136 B1* | 8/2003 | Atsmon | ................ | G06F 21/34 235/487 |
| 9,002,750 B1* | 4/2015 | Chu | ................ | H04L 63/0838 705/55 |
| 2002/0198848 A1* | 12/2002 | Michener | ................ | G06Q 20/04 705/75 |
| 2004/0172535 A1 | 9/2004 | Jakobsson et al. | | |
| 2006/0174105 A1* | 8/2006 | Park | ................ | G06F 21/34 713/155 |
| 2011/0258452 A1* | 10/2011 | Coulier | ................ | G06F 21/31 713/171 |
| 2012/0210408 A1* | 8/2012 | Lu | ................ | H04L 63/0846 726/6 |
| 2013/0031039 A1* | 1/2013 | Sim | ................ | G06N 3/049 706/26 |

\* cited by examiner

METHOD AND SYSTEM FOR GENERATING AND AUTHORIZING DYNAMIC PASSWORD

TECHNICAL FIELD

The invention belongs to identity verification field, and more particularly, relates to a method for generating and verifying a dynamic password and a system therefor.

PRIOR ART

Dynamic password is widely applied in identity verification field. In the prior art, the dynamic password can be classified into time type dynamic password, event type dynamic password and challenge-response type dynamic password. For general time-type dynamic password or challenge-response type dynamic password with participation of time computing, only one dynamic password can be generated over a dynamic password change period. Considering security, if the dynamic password is verified successfully by a verification server, the dynamic password cannot be used repeatedly. If verification is needed, the only thing can be done is waiting for generating a different dynamic password till the next time period starts, which cannot be satisfied with requirement of performing identity verification for many times in a short time;

For a general event type dynamic password, a dynamic token keeps on generating dynamic passwords while the generated passwords are not verified by a server, which may cause situation that the token and the server are not synchronized. In addition, the times introduced by the generated event type dynamic password is a predictable dynamic factor, therefore some security vulnerability exists.

SUMMARY OF THE INVENTION

The object of the present invention is to provide a method for generating and verifying a dynamic password and a system therefor, which introduces a group of data for participating in generation of time-type dynamic password; in one time period, respective data in the group of data can participate in generation of dynamic password in a cycle style.

According to one aspect of the present invention, there is provided a method for generating and verifying a dynamic password which comprises:

S1, receiving, by a token, a command for generating a dynamic password and generating a first dynamic factor according to time counted by a first timer inside the token; in which when the token detects a preset condition, it initializes a first offset pointer;

S2, determining, by the token, whether the first offset pointer is in an invalid state, if yes, reporting an error; otherwise, keeping on operating;

S3, obtaining, by the token, current data from a first data group according to the first offset pointer, invoking a preset algorithm, and obtaining a first dynamic password by computing according to the first dynamic factor and the current data; determining whether the current data is the last data in the first data group, if yes, setting the first offset pointer as the invalid state; otherwise, pointing the first offset pointer to the next data of the current data;

S4, receiving, by a server, a second dynamic password input by a user, and obtaining a second dynamic factor according to time counted by a second timer inside the server;

S5, generating a group of dynamic factors according to the second dynamic factor and a verification window value so as to obtain a verification window; and S6, invoking the preset algorithm, and generating a group of dynamic passwords by computing according to the dynamic factors in the verification window and respective data in a second data group stored inside the server, verifying whether a dynamic password, which is identical to the second dynamic password, exists in the group of dynamic passwords, if yes, the verification is successful; otherwise, the verification is failed.

Preferably, the first data group, which is identical to the second data group, comprises: a preset number of data which are in order and are different from each other;

the current data is the data which is pointed by the first offset pointer.

Preferably in Step S1, generating the first dynamic factor according to the time counted by the first timer inside the token specifically comprises: dividing the number of seconds counted by the first timer by a first preset time length value, and performing a rounding operation on an obtained quotient so as to obtain the first dynamic factor; and in Step S4, generating the second dynamic factor according to time counted by the second timer inside the server specifically comprises dividing the number of seconds counted by the second timer by the first preset time length value, and performing a rounding operation on an obtained quotient so as to obtain the second dynamic factor.

Preferably, that when the token detects the preset condition, the token initializes the first offset pointer specifically comprises: monitoring, by the token, time counted by the first time at real time, and initializing the first offset pointer every the first preset time length; and initializing the first offset pointer specifically comprises: pointing the first offset pointer to the first data in the first data group.

Preferably, that when the token detects the preset condition, it initializes the first offset pointer specifically comprises, after generating the first dynamic factor, determining whether the first dynamic factor is identical to data in a first cache by the token, if no, initializing the first offset pointer;

after the token initializing the first offset pointer, updating the data in the first cache with the first dynamic factor; and initializing the first offset pointer specifically comprises pointing the first offset pointer to a first data in the first data group.

Preferably, generating a group of dynamic passwords in Step 6 specifically comprises: invoking the preset algorithm, respectively computing data obtained by combining each dynamic factor in the verification window and respective data in the second data so as to obtain the group of dynamic passwords.

Preferably, Step S6 specifically comprises:

Step a, invoking the first dynamic factor in the verification window according to a preset order;

Step b, combining respective data in the second data group with the invoked dynamic factor orderly, and invoking the preset algorithm to compute respective data obtained by combining so as to obtain the group of dynamic passwords;

Step c, verifying whether a dynamic password, which is identical to the second dynamic password, exists in the group of dynamic passwords, if yes, the verification is successful; otherwise, go to Step d; and Step d, determining whether the invoked dynamic factor is the last dynamic factor in the verification window, if yes, the verification is failed; otherwise, invoking a next dynamic factor, then go back to Step b.

Preferably, in Step S6, when a dynamic password, which is identical to the second dynamic password, exists in the group of dynamic passwords, the method further comprises S7, invoking, by the server, data in the second cache and comparing the dynamic factor of the dynamic password which is identical to the second dynamic password with the data in the second cache, if the dynamic factor is more than the data in the second cache, the verification is successful, then go to Step S8; if the dynamic factor is less than the data in the second cache, the verification is failed; if the dynamic factor is equal to the data in the second cache, go to Step S9;

S8, updating the data in the second cache with the dynamic factor corresponding to the dynamic password which is identical to the second dynamic password, and setting the second offset pointer to point to the data corresponding to the dynamic password, which is identical to the second dynamic password, in the second data group; and S9, determining whether the data corresponding to the dynamic password which is identical to the second dynamic password is located after the data pointed by the second offset pointer in the second data group, if yes, the verification is successful and setting the second offset pointer to point to the data corresponding to the dynamic password, which is identical to the second dynamic password, in the second data group; otherwise, the verification is failed.

Preferably, after Step S1, the method further comprises a step that the token prompts a user to input transaction account number, transaction amount and a challenge code;

before Step S4, the method further comprises a step that the server generates the challenge code;

in Step S3, obtaining the first dynamic password by computing according to the first dynamic factor and the current data specifically comprises:

combining the first dynamic factor and the current data with the token key and the account number, amount and challenge code of the token input by the user, and computing the data obtained by combination with the preset algorithm so as to obtain the first dynamic password; and in Step S6, invoking the preset algorithm and generating a group of dynamic passwords by computing according to the dynamic factor in the verification window and respective data of the second data group stored inside the server specifically comprises:

combining in order respective dynamic factors in the verification window and respective data in the second data group, token key, account number and amount input by the user and received by the server, and the challenge code generated by the server, and obtaining a group of dynamic passwords by computing with the preset algorithm according to respective data obtained by combination.

Preferably, generating a group of dynamic passwords in Step S6 specifically comprises comparing the data in the second cache with the dynamic factor in the verification window; obtaining a dynamic factor, which is equal to or more than the data in the second cache, from the verification window;

combining the respective dynamic factors which is more than the data in the second cache with the respective data in the second data group, invoking the preset algorithm to perform computing on the data obtained by combining so as to obtain a first part of a dynamic password; combining the dynamic factor which is equal to the data in the second cache with the respective data, which are located after the data pointed by the second offset pointer, in the second data group; invoking the preset algorithm to perform computing on the respective data obtained by combining so as to obtain a second part of the dynamic password; and combining the first part of the dynamic password with the second part of the dynamic password so as to obtain a group of dynamic passwords.

Preferably, when verifying that a dynamic password which is identical to the second dynamic password exists in the group of dynamic passwords, Step S6 further comprises updating the data in the second cache with the dynamic factor corresponding to the dynamic password which is identical to the second dynamic password; and pointing the second offset pointer to the data in the second data group corresponding to the dynamic password which is identical to the second dynamic password.

According to another aspect of the present invention, there is provided a system for generating and verifying a dynamic password, comprising a token and a server, wherein the token comprises a first receiving module configured to receive a command for generating the dynamic password;

a first generating module configured to generate a first dynamic factor according to time counted by a first timer inside the token when the first receiving module receives the command for generating the dynamic password;

an operating module configured to initialize a first offset pointer every a first preset time length; or initialize the first offset pointer when determining that the first dynamic factor is not identical to the data in the first cache and update the data in the first cache with the first dynamic factor;

a first computing module configured to obtain a current data from a first data group according to the first offset pointer, invoke a preset algorithm and compute according to the first dynamic factor and the current data so as to obtain a first dynamic password;

a first determining module configured to determine whether the current data is the last data in the first data group after the first computing module obtains the first dynamic password by computing; and a setting module configured to point the first offset pointer to the next data of the current data in the first data group when the current data is not the last data; while set the first offset pointer as invalid state when the current data is the last data and wait for initializing; and the server comprises a second receiving module configured to receive a second dynamic password input by a user via a host;

a second generating module configured to obtain a second dynamic factor according to time counted by a second timer inside the server; generate a group of dynamic factors according to the second dynamic factor and the verification window value so as to obtain a verification window;

a second computing module configured to invoke the preset algorithm and compute according to the dynamic factor in the verification window and respective data in the second data group stored inside the server so as to generate a group of dynamic passwords; and a verifying module configured to verify whether a dynamic password which is identical to the second dynamic password exists in a first group of dynamic passwords.

Preferably, the second computing module comprises a first invoking unit configured to invoke the preset algorithm and the first dynamic factor in the verification window;

a first combining unit configured to combine respective dynamic factors in the verification window and respective data in the second data group respectively and orderly; and a first processing unit configured to compute respective data obtained by combining by the first combining unit with the preset algorithm so as to obtain a group of dynamic passwords.

Preferably, the second computing module comprises a second invoking unit configured to invoke the preset algorithm and invoke the dynamic factors in the verification window orderly;

a second combining unit configured to combine respective data in the second data group with the invoked dynamic factor;

a second processing unit configured to compute data obtained by combining by the combining unit with the preset algorithm so as to obtain a group of dynamic passwords; and the verifying module comprises a first verifying unit configured to verify whether a dynamic password, which is identical to the second dynamic password, exists in the group of dynamic passwords obtained by computing by the second processing unit; and a first determining unit configured to determine whether the invoked dynamic factor is the last dynamic factor in the verification window when the first verifying unit verifies that no dynamic password, which is identical to the second dynamic password, exists in the group of dynamic passwords; if the current dynamic factor is not the last dynamic factor, invoking the next dynamic factor and the second combining unit starts working.

Preferably, the system further comprises a comparing module configured to compare the dynamic factor corresponding to the dynamic password which is identical to the second dynamic password with the data in the second cache when the verifying module verifies that a dynamic password which is identical to the second dynamic password exists in the group of dynamic passwords; if the dynamic factor is more than the data in the second cache, the verification is successful and a first updating module works; if the dynamic factor is less than the data in the second cache, the verification is failed; and if the dynamic factor is equal to the data in the second cache, the second determining module works;

the first updating module configured to update the data in the second cache with the dynamic factor corresponding to the dynamic password which is identical to the second dynamic password and set a second offset pointer to point to the data, which is identical to the second dynamic password, in the second data group; and the second determining module configured to determine whether an order of the data corresponding to the dynamic password, which is identical to the second dynamic password, in the second data group is located behind the data pointed by the second offset pointer, if yes, the verification is successful and set the second offset pointer to point to the data corresponding to the dynamic password, which is identical to the second dynamic password, in the second data group; otherwise, the verification is failed.

Preferably, the system further comprises a comparing module configured to compare the dynamic factor corresponding to the dynamic password, which is identical to the second dynamic password, with the data in the second cache when the verifying module verifies that a dynamic password, which is identical to the second dynamic password, exists in the group of dynamic passwords, if the dynamic factor is more than the data in the second cache, the verification is successful and the first updating module works; if the dynamic factor is less than the data in the second cache, the verification is failed; and if the dynamic factor is equal to the data in the second cache, the second determining module works;

the first updating module configured to update the data in the second cache with the dynamic factor corresponding to the dynamic password which is identical to the second dynamic password and set the second offset pointer to point to data corresponding to the dynamic password, which is identical to the second dynamic password, in the second data group; and the second determining module configured to determine whether an order of the data corresponding to the dynamic password, which is identical to the second dynamic password, in the second data group is located behind the data pointed by the second offset pointer, if yes, the verification is successful and set the second offset pointer to the data corresponding to the dynamic password, which is identical to the second dynamic password, in the second data group, in the second data group; otherwise, the verification is failed.

Preferably, the second computing module comprises a searching unit configured to find the dynamic factor which is equal to or more than the data in the second cache in the verification window;

a third processing unit configured to combine the dynamic factor which is more than the data in the second cache with respective data in the second data group orderly and respectively, invoke the preset algorithm to compute the data obtained by combining so as to obtain a first part of a dynamic password; combine the dynamic factor, which is equal to the data in the second cache, with respective data located after the data to which is pointed by the second offset pointer in the second data group respectively, invoke the preset algorithm and compute respective data obtained by combining so as to obtain a second part of the dynamic password; and combine the first part of the dynamic password and the second part of the dynamic password so as to obtain the group of dynamic passwords.

Preferably, the system further comprises a second updating module configured to, when the verifying module verifies that a dynamic password, which is identical to the second dynamic password, exists in the group of dynamic passwords, update the data in the second cache with the dynamic factor corresponding to the dynamic password which is identical to the second dynamic password, point the second offset pointer to the data in the second data group corresponding to the dynamic password which is identical to the second dynamic password.

Preferably, the first receiving module further configured to receive data which is input into the token by the user;

the second receiving module further configured to receive data which is input into the server by the user via the host; and the second generating module configured to generate the challenge code.

Preferably, the first computing module comprises a third combining unit configured to combine the first dynamic factor, the current data, the token key with the data of the token input by a user; and a fourth processing unit configured to invoke the preset algorithm to compute the data obtained by combining by the third combining unit so as to obtain the first dynamic password.

Based on time type dynamic token and event type dynamic token, the solution provided by the present invention improves security of the dynamic password verification and satisfies with situation in which identity is required to be verified for many times in a short time, which provides many choices in verification mode in process of identity verification.

DETAILED DESCRIPTION OF THE INVENTION

The technical solutions of the embodiments of the disclosure are described in a clear and complete manner in association with the accompanying drawings as follows. Apparently, the described embodiments are merely a part of, rather than, all embodiments of the disclosure. Based on the described embodiments of the disclosure, other embodiments obtained by those skilled in the art without conducting inventive work should fall into the scope of the disclosure.

Embodiment 1

Figure 1:
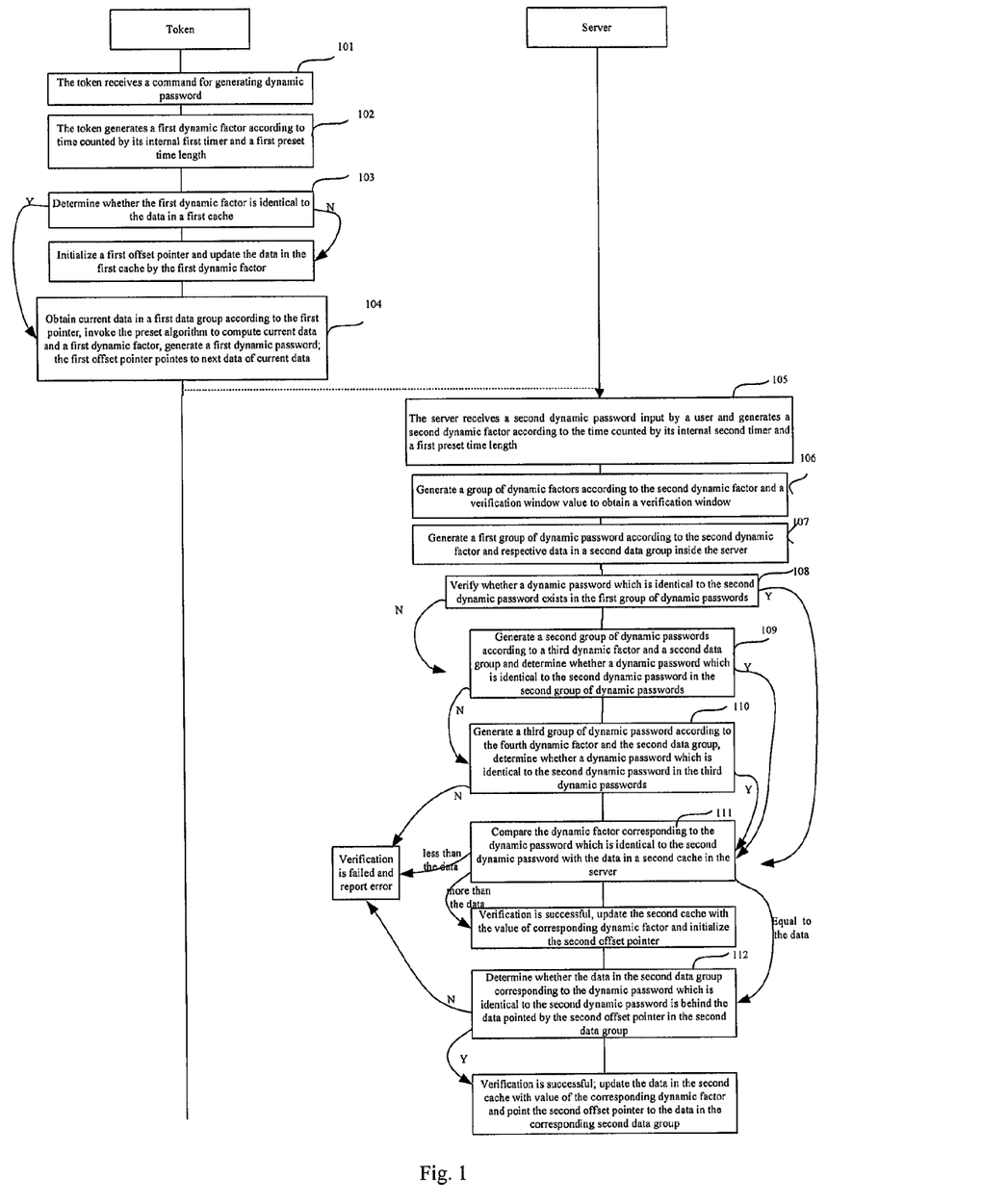
FIG. 1 is a flow chart of a method for generating and verifying a dynamic password provided in Embodiment 1 of the present invention.

Embodiment 1 of the present invention provides a method for generating and verifying a dynamic password, which specifically comprises:

Step 101, a token receives a command for triggering and generating dynamic password;

Preferably, in Embodiment 1, the command for generating dynamic password can be press key trigger information; after Step 101, the method further includes a step that the token prompts a user to input data, such as challenge code, transaction account number, transaction amount, etc. into the token.

In Embodiment 1, the token can make a choice from many types of dynamic passwords. For example, the token can have different press keys for a user to choose generating different types of dynamic passwords for logging in account, modifying account information, transferring money, transaction, etc., and prompt the user to input corresponding data according to an agreement preset with a server.

Step 102, the token generating a first dynamic factor according to time counted by a first timer inside the token and a first preset time length;

Preferably, in Embodiment 1, the first dynamic factor is the number of the complete first preset time length contained in the time counted by the first timer; specifically, in Embodiment 1, generating the dynamic factor includes dividing the time value counted by the timer by the first preset time length to obtain a quotient and performing rounding operation on the quotient to obtain the first dynamic factor.

Step 103, determine whether the first dynamic factor is identical to the data in the first cache, if yes, go to Step 104; otherwise, initialize a first offset point and update the data in the first cache with the first dynamic factor, then go to Step 104;

Preferably, in Embodiment 1, the first offset pointer points to some data in a first data group; after the first offset pointer is initialized, the first offset pointer points to the first data in the first data group.

The data stored in the first cache can be a dynamic factor which is generated when the token generates the last dynamic password; or a corresponding dynamic factor when the first offset pointer is initialized last time.

In Embodiment 1, the offset pointer can be initialized according to the time counted by the timer; according to the timer, the first offset pointer is initialized once every preset time length; correspondingly, Step 103 is deleted, i.e. go to Step 104 directly after Step 102.

Step 104, obtain current data from the first data group according to the first offset pointer, invoke the preset algorithm to compute current data and the first dynamic factor and generate a first dynamic password; the offset pointer points to the next data of the current data in the first data group;

Preferably, in Embodiment 1, before Step 101, the method further includes that when the token prompts the user to input data such as challenge code, transaction account number, transaction amount, etc., all of the data input into the token by the user, current data, the first dynamic factor and token key participate in generating a dynamic password. Generating the first dynamic password specifically includes invoking the preset algorithm such as SHA1, SM3, etc. to compute the data obtained by combined data and obtain the first dynamic password by extracting preset digits of data from the computing result.

Specifically, in Step 104 of Embodiment 1, the first offset pointer points to next data of current data further includes verifying the current data is the last data in a second data group, if yes, setting the first offset pointer to invalid status and waiting for initializing; otherwise, pointing the first offset pointer to the next data of the current data. Correspondingly, before Step 104, the method further includes a step that the token determines whether the first offset pointer is invalid state; if yes, report error; if no, go to Step 104.

The data in the first data group are different from each other and the order and the number of data are fixed. The first data group can be a group of irregular data or a group of data with regular change, such as data which are gradually increasing or gradually decreasing, etc.

Step 105, the server receives a second dynamic password input by the user and generates a second dynamic factor according to the time counted by a second timer and the first preset time length;

Preferably, in Embodiment 1, the server receives the second dynamic password input by the use via a host.

Generating the second dynamic factor specifically includes that the second dynamic factor is obtained by dividing the time counted by the second timer by the preset time length to obtain a quotient, performing rounding operation on the quotient so as to obtain a result and adding the result to a shift value recorded by the server.

Before Step 105, the method further includes a step that the server receives an operating request sent by the user and prompts the user to input a dynamic password; particularly, when it is preset that a challenge code is required to participate in generating a dynamic password, a step that the server generates a challenge code is performed before Step 105.

Step 106, generate a group of dynamic factors according to the second dynamic factor and a verification window value so as to obtain a verification window;

Preferably, in Embodiment 1, for example, the verification window value is 2; the generated group of dynamic factors includes a third dynamic factor obtained by subtracting 1 from the value of the second dynamic factor; the second dynamic factor, and a fourth dynamic factor obtained by adding 1 to the value of the second dynamic factor.

Step 107, the server invokes the second dynamic factor in the verification window and generates a group of dynamic passwords according to the second dynamic factor and respective data in the second data group inside the server;

Preferably, in Embodiment 1, the data, the number of data and the order of data in the second data group is identical to that in the first data group. That the server generates the first group of dynamic passwords specifically includes invoking the preset algorithm, combining the second dynamic factor and respective data in the second data group respectively, computing the respective data obtained by combining to obtain the first group of dynamic passwords; the algorithm of generating each dynamic password and the process thereof is identical to that of Step 104. Particularly, when the token generates the dynamic password with participation of information, which is predetermined with the server and input by the user, or a challenge code, in Step 107, the process of generating the dynamic password is identical to the process that the token generates the first dynamic password; the data which is input into the server by the user via the host and corresponding data in the challenge code generated by the server participate in generating the first group of dynamic password.

The present Embodiment 1 provides a preferable way so as to clearly describe process of generating a dynamic password. For example, respective data in the second data group are as the following order: ten data from 0x 00 00 00 00 to 00 00 00 09, the second dynamic factor of 0x 00 00 00 00 01 56 56 01, the challenge code of 0x 31 32 33 34 35 36 37 38-39 30 and token key of 0x 80 d0 3f 19 3f e5 0c 2d-de 8a 84 46bf a2 88 de 35 92 65 1c; the preset algorithm is SM3; specifically, the key is sequentially assembled with second dynamic factor and then respectively sequentially assembled with the ten data in the second data group to obtain ten assembled data; then the challenged code is assembled after the assembled data respectively so as to obtain ten combined data; the preset algorithm is used to compute the ten combined data respectively to obtain ten pieces of digest; four bytes of data at low-order end are intercepted from respective pieces of digest and then all of the incepted data are transferred into decimal numbers; 8 bits of data of lower order are intercepted from ten decimal numbers respectively so as to obtain the first group of dynamic passwords.

Step 108, the server verifies whether a dynamic password which is identical to the second dynamic password exists in the first group of dynamic passwords; if yes, go to Step 111; otherwise, go to Step 109;

Step 109, the server invokes the next dynamic factor of the second dynamic factor in the verification window, generates the second group of dynamic passwords according to the invoked dynamic factor and the second data group and determine whether a dynamic password, which is identical to the second dynamic password, exists in the second group of dynamic passwords; if yes, go to Step 111; otherwise, go to Step 110;

In Embodiment 1, refer to Step 107 for the process of generating the second group of dynamic passwords.

Step 110, the server invokes the next dynamic factor of a currently invoked dynamic factor in the verification window, generates a third group of dynamic passwords according to currently invoked dynamic factor and the second data group, determines whether a dynamic password, which is identical to the second dynamic password, exists in the third group of dynamic passwords; if yes, go to Step 111; otherwise, the verification is failed, reporting an error;

Refer to Step 107 for the process of generating the third group of dynamic passwords.

Preferably, in Embodiment 1, the verification window value is 2, therefore the verification window has 3 dynamic factors; the sequence of invoking the dynamic factors is as the following: firstly, the second dynamic factor is invoked and then the second dynamic factor plus and minus 1 to obtain the dynamic factors. The verification window value can be other values; correspondingly, the verification window includes other dynamic factors; in Step 110, if a dynamic password, which is not identical to the second dynamic password, does not exist in the third group of dynamic passwords, dynamic passwords are generated by invoking other dynamic factors in turns and verified as well. The sequence of invoking other dynamic factors according to orders of the absolute values of different of the dynamic factors and the second dynamic factor, i.e. from small to large.

Step 111, compare the dynamic factor corresponding to the dynamic password, which is identical to the second dynamic password, with the data in the second cache of the server;

if the corresponding dynamic factor is less than the data in the second cache, the verification is failed and an error is reported;

if the corresponding dynamic factor is equal to the data in the second cache, go to Step 112;

if the corresponding dynamic factor is more than the data in the second cache, the verification is successful; update the data in the second cache with the corresponding dynamic factor and initialize the second offset pointer.

Preferably, in Embodiment 1, after initializing, the second offset pointer points to the first data in the second data group.

Step 112, determine whether the position of data in the second data group corresponding to the dynamic password which is identical to the second dynamic password is located behind the data which is pointed to by the second offset pointer; if yes, the verification is successful, update the data in the second cache with the value of the corresponding dynamic factor and point the second offset pointer to the corresponding data in the second data group; otherwise, the verification is failed and an error is reported.

Figure 2:
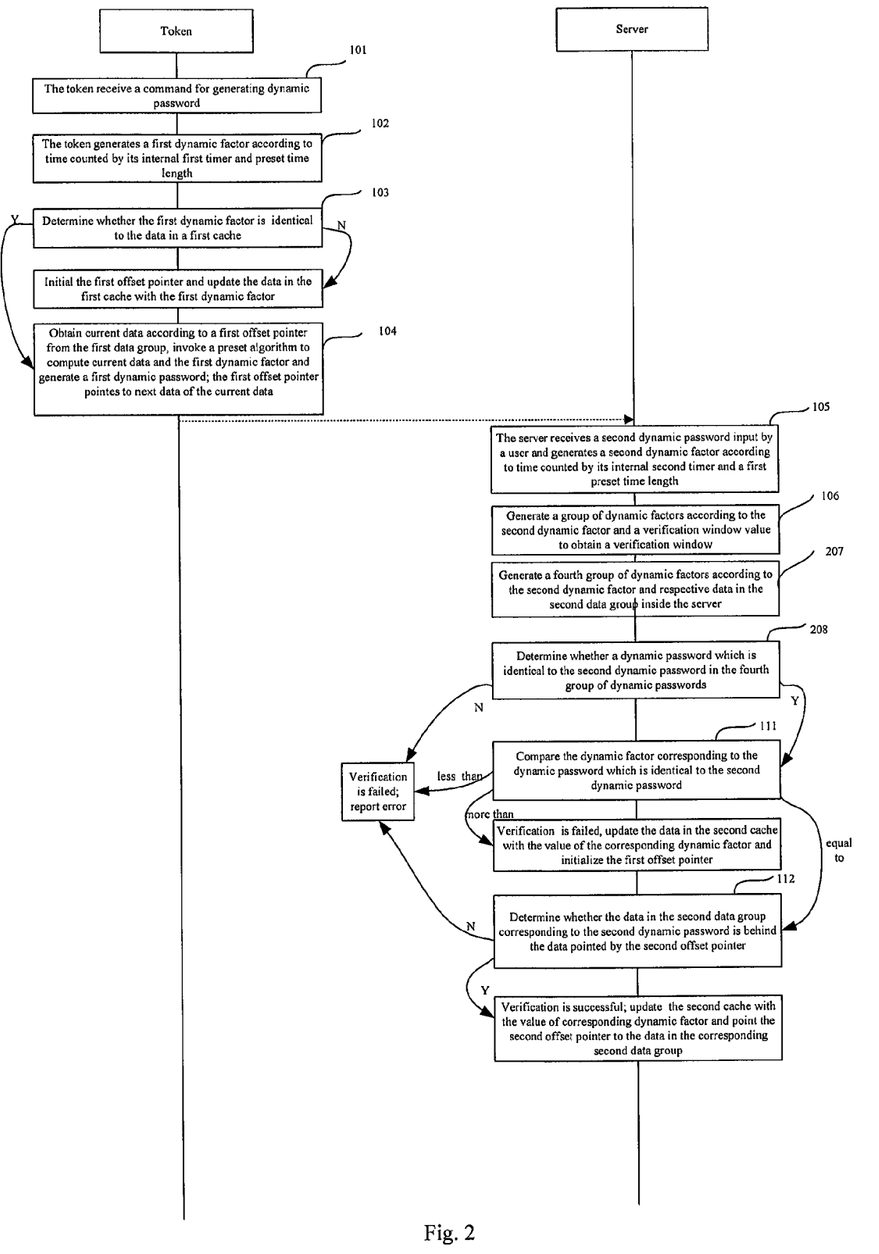
FIG. 2 is another flow chart of implementing the method for generating and verifying the dynamic password according to Embodiment 1 of the present invention.

Preferably, in Embodiment 1, the data pointed to by the second offset pointer is the data in the second data group corresponding to the dynamic password which is verified successfully last time. Referring to FIG. 2, Step 107 to Step 110 can be replaced by following steps.

Step 207, generate a fourth group of dynamic passwords according to the second data group and the dynamic factors in the verification window;

Preferably, in Embodiment 1, obtain the fourth group of dynamic passwords according to respective dynamic factors in the verification window and respective data in the second data group. Specifically, the fourth group of dynamic passwords includes all dynamic passwords of the first group of dynamic passwords, the second group of dynamic password and the third group of dynamic passwords; for the way of generating dynamic passwords, refer to Step 107.

Specifically, in Embodiment 1, the verification window value is 2 and the second data group has ten data; correspondingly, subtract 1 from the second dynamic factor and add 1 to the second dynamic factor to obtain three different dynamic factors; generate the fourth dynamic password according to the third dynamic factor and the respective data in the second data group; the obtained fourth group of dynamic passwords includes 30 dynamic passwords.

Step 208, determine whether a dynamic password which is identical to the second dynamic password exists in the fourth dynamic passwords; if yes, go to Step 111; otherwise, the verification is failed and an error is reported.

Figure 3:
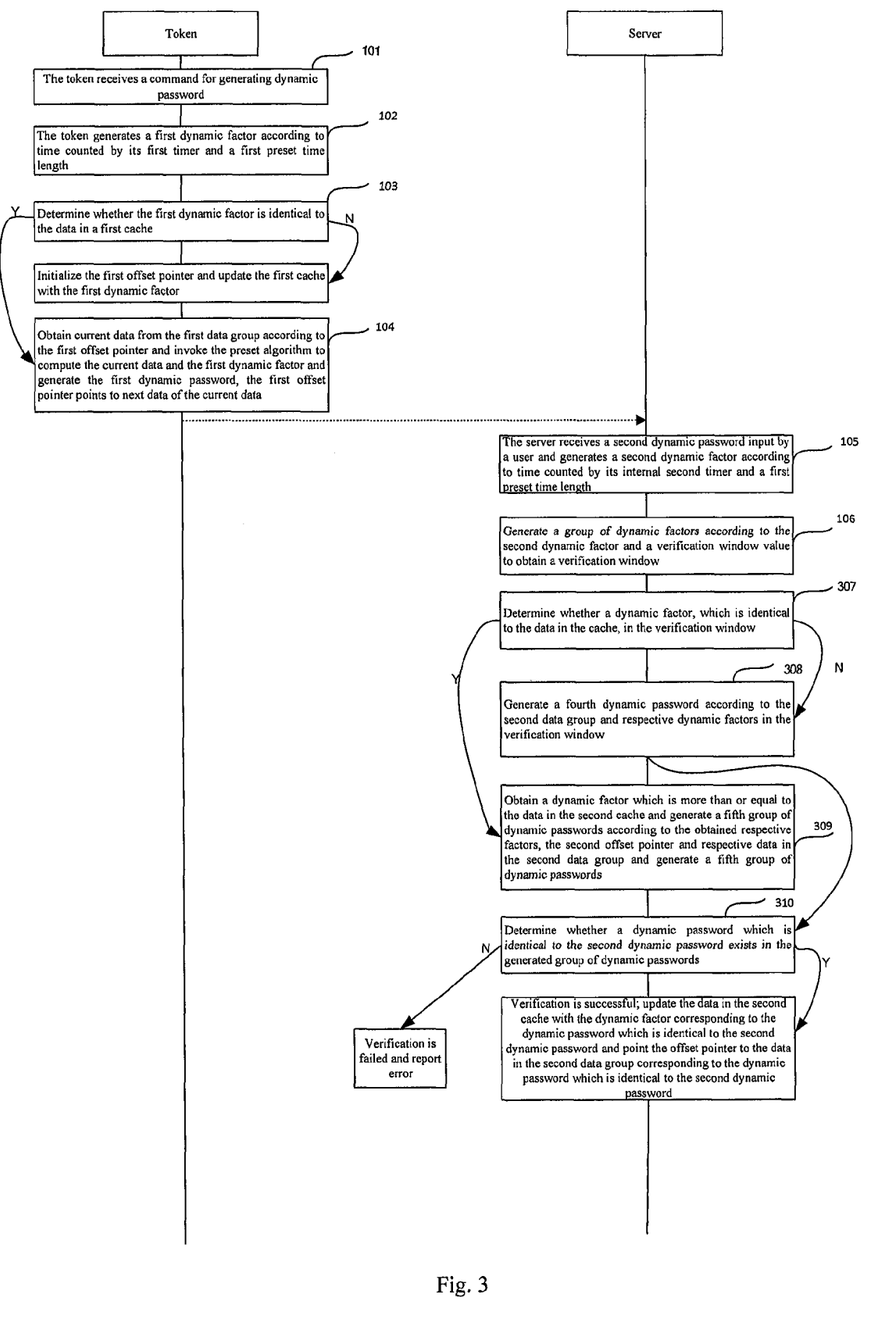
FIG. 3 is another flow chart of implementing the method for generating and verifying the dynamic password according to Embodiment 1 of the present invention.

Referring to FIG. 3, preferably, in Embodiment 1, Step 107 to Step 112 can be replaced by following steps.

Step 307, determine whether a dynamic factor which is identical to the data in the second cache exists in the verification window;

if no, go to Step 308;

if yes, go to Step 309;

Step 308, generate the fourth group of dynamic passwords according to the respective dynamic factors in the verification window and the second data group; go to Step 310;

Preferably, for detail of Step 308, refer to Step 207.

Step 309, obtain a dynamic factor, which is more than or equal to the data in the second cache, in the verification window; generate the fifth group of dynamic passwords according to the obtained respective dynamic factors, the second offset pointer and the respective data in the second data group; go to Step 310;

Specifically, in Embodiment 1, the value of the verification window is 2; if the second dynamic factor in the verification window is identical to the data in the second cache, Step 309 specifically includes obtaining a first part of a dynamic password by computing the second dynamic factor and respective data in the second data group respectively; generating the second part of the dynamic password according to the data pointed to by the second offset pointer by taking the respective data located after the data pointed to by the second offset pointer and the obtained respective dynamic factors which are more than the second dynamic factor; the first part of the dynamic password and the second part of the dynamic password are combined to form a fifth dynamic passwords.

Step 310, determine whether a dynamic password, which is identical to the second dynamic password, exists in the generated group of dynamic passwords, if yes, the verification is successful and update the data in the second cache with the dynamic factor corresponding to the dynamic password which is identical to the second dynamic password and point the second offset pointer to the data corresponding to the dynamic password, which is identical to the second dynamic password, in the second data group; otherwise, the verification is failed and an error is reported.

Embodiment 2

Figure 4:
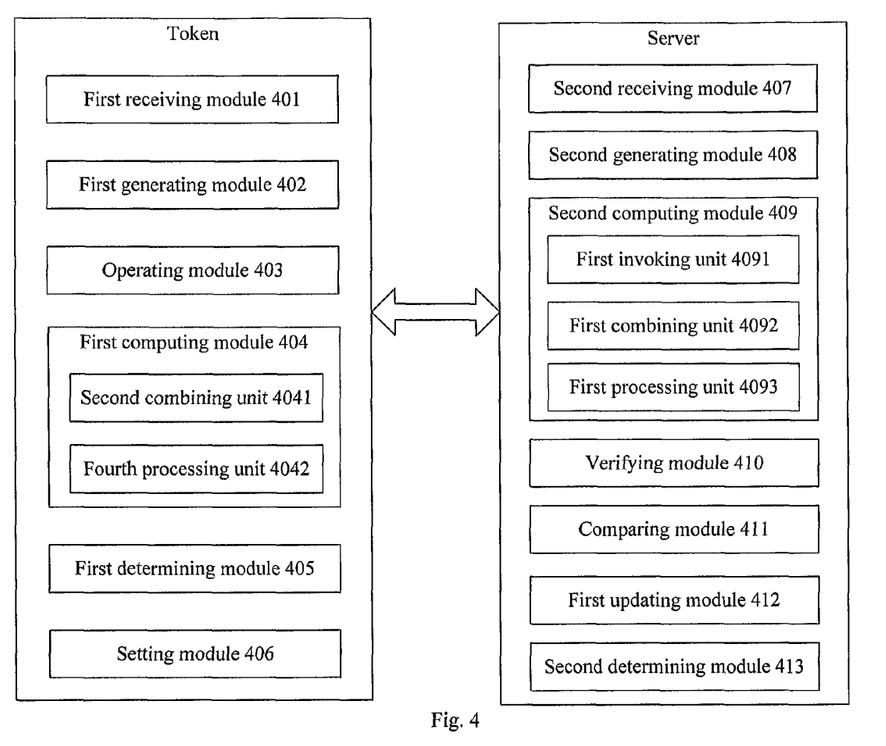
FIG. 4 is a systematic block diagram of generating and verifying the dynamic password according to Embodiment 2 of the present invention.

Referring to FIG. 4, Embodiment 2 of the present invention provides a system of generating and verifying a dynamic password, which includes a token and a server. The token includes a first receiving module 401 configured to receive a command for generating dynamic password;

a first generating module 402 configured to generate a first dynamic factor according to time counted by a first timer inside the token when the first receiving module 401 receives the command for generating dynamic password;

an operating module 403 configured to initialize a first offset pointer every preset time length; or initialize the first offset pointer when determining that the first dynamic factor is not identical to the data in the first cache and update the data in the first cache with the first dynamic factor;

a first computing module 404 configured to obtain current data from a first data group according to the first offset pointer, invoke the preset algorithm and obtain a first dynamic password by computing according to the first dynamic factor and current data;

a first determining module 405 configured to determine whether the current data is the last data in the first data group after the first computing module 404 obtained the first dynamic password by computing; and a setting module 406 configured to point the first offset pointer to next data of current data in the first data group when the current data is not the last data; set the first offset pointer as invalid state when the current data is the last data and wait for initializing; and the server comprises a second receiving module 407 configured to receive a second dynamic password input by a user via a host;

a second generating module 408 configured to obtain a second dynamic factor according to time counted by a second timer inside the server; generate a group of dynamic factors according to the second dynamic factor and a verification window value to obtain a verification window;

a second computing module 409 configured to invoke the preset algorithm and generate a group of dynamic passwords by computing according to the dynamic factor in the verification window and respective data in the second data group stored inside the server; and a verifying module 410 configured to verify whether a dynamic password which is identical to the second dynamic password exists in the group of dynamic passwords.

In Embodiment 2, the server of the system further includes a comparing module 411 configured to compare the dynamic factor corresponding to the dynamic password which is identical to the second dynamic password with the data in the second cache when the verifying module 410 verifies that a dynamic password which is identical to the second dynamic password exists in the group of dynamic passwords; if the dynamic factor is more than the data in the second cache, verification is successful and a first updating module 412 works; if the dynamic factor is less than the data in the second cache, verification is failed; and if the dynamic factor is equal to the data in the second cache, the second determining module 413 works;

the first updating module 412 configured to update the data in the second cache with the dynamic factor corresponding to the dynamic password which is identical to the second dynamic password and set the second offset pointer to point to data corresponding to the dynamic password, which is identical to the second dynamic password, in the second data group;

the second determining module 413 configured to determine whether order of data corresponding to the dynamic password, which is identical to the second dynamic password, in the second data group is behind the data pointed by the second offset pointer, if yes, the verification is successful and set the second offset pointer to point to the data corresponding to the dynamic password, which is identical to the second dynamic password, in the second data group; otherwise, the verification is failed.

The first receiving module 401 is further configured to receive data which is input into the token by the user;

the second receiving module 407 is further configured to receive data which is input into the server by the user via the host; and the second generating module 408 is further configured to generate the challenge code.

The first computing module 404 includes a third combining unit 4041 configured to combine the first dynamic factor, the current data, the token key with the data which is input into the token by the user; and a fourth processing unit 4042 configured to invoke the preset algorithm to compute the data obtained by combining by the third combining unit to obtain the first dynamic password.

The second computing module 409 includes a first invoking unit 4091 configured to invoke the preset algorithm and the first dynamic factor in the verification window;

a first combining unit 4092 configured to combine respective dynamic factors in the verification window with respective data in the second data group respectively and orderly; and a first processing unit 4093 configured to compute respective data, which is obtained by combining by the first combining unit 4092, with the preset algorithm so as to obtain the group of dynamic passwords.

Preferably, in Embodiment 2, the second computing module 409 can alternatively include a second invoking unit configured to invoke the preset algorithm and invoke the dynamic factors in the verification window orderly;

a second combining unit configured to combine respective data in the second data group with the invoked dynamic factor respectively; and a second processing unit configured to compute data obtained by combining by the combining unit with the preset algorithm to obtain a group of dynamic passwords;

Correspondingly, the verifying module 410 comprises a first verifying unit configured to verify whether a dynamic password, which is identical to the second dynamic password, exists in the group of dynamic passwords obtained by computing by the second processing unit; and a first determining unit configured to determine whether the invoked dynamic factor is the last dynamic factor in the verification window when the first verifying unit 4101 verifies that no dynamic password, which is identical to the second dynamic password, exists in the group of dynamic passwords; if the currently invoked dynamic factor is not the last dynamic factor, invoking a next dynamic factor and the second combining unit starts working.

Or, the second computing module 409 includes a searching unit configured to find the dynamic factor which is equal to or more than the data in the second cache in the verification window; and a third processing unit configured to combine the dynamic factor, which is more than the data in the second cache, with respective data in the second data group orderly and respectively, invoke the preset algorithm to compute the data obtained by combining so as to obtain a first part of a dynamic password; combine the dynamic factor, which is equal to the data in the second cache, with respective data after the data to which is pointed by the second offset pointer in the second data group respectively, invoke the preset algorithm and compute respective data obtained by combining so as to obtain a second part of the dynamic password; and combine the first part of the dynamic password and the second part of the dynamic password so as to obtain the group of dynamic passwords.

Correspondingly, the system further comprises a second updating module configured to, when the verifying module 410 verifies that a dynamic password, which is identical to the second dynamic password, exists in the group of dynamic passwords, update the data in the second cache with the dynamic factor corresponding to the dynamic password which is identical to the second dynamic password, and point the second offset pointer to the data in the second data group corresponding to the dynamic password which is identical to the second dynamic password.

Above description is only to illustrate the preferred embodiments but not to limit the present invention. Any modification and equivalent substitute made by those skilled in the art in the scope of the technical solution of the present disclosure should fall into the scope of protection of the present disclosure.

The invention claimed is:

1. A method for generating and verifying a dynamic password, said method comprises the steps of:
   receiving, by a token, a command for generating dynamic password and generating a first dynamic factor by dividing the number of seconds counted by the first timer by a first preset time length and performing a rounding operation on an obtained quotient so as to obtain the first dynamic factor according to time counted by a first timer inside the token; in which when the token detects a preset condition, it initializes a first offset pointer;
   determining, by the token, whether the first offset pointer is in an invalid state, if yes, reporting an error; otherwise, keeping on operating;
   obtaining, by the token, a current data from a first data group according to the first offset pointer, invoking preset algorithm, and obtaining a first dynamic password by computing according to the first dynamic factor and the current data; determining whether the current data is the last data in the first data group, if yes, setting the first offset pointer as the invalid state; otherwise, pointing the first offset pointer to the next data of the current data;
   receiving, by a server, a second dynamic password input by a user, and obtaining a second dynamic factor by dividing the number of seconds counted by the second timer by the first preset time length and performing a rounding operation on an obtained quotient so as to obtain the second dynamic factor according to time counted by a second timer inside the server;
   generating a group of dynamic factors according to the second dynamic factor and a verification window value so as to obtain a verification window; and
   invoking the preset algorithm, and generating a group of dynamic passwords by computing according to the dynamic factors in the verification window and respective data in a second data group stored inside the server, verifying whether a dynamic password, which is identical to the second dynamic password, exists in the group of dynamic passwords, if yes, the verification is successful; otherwise, the verification is failed wherein the first data group, which is identical to the second data group, comprises: a preset number of data which are in order and are different from each other; the current data is the data which is pointed by the first offset pointer.

2. The method of claim 1, wherein that when the token detects the preset condition, it initializes the first offset pointer specifically comprises: monitoring, by the token, the time counted by the first timer at real time, and initializing the first offset pointer at intervals of the first preset time length; and initializing the first offset pointer specifically comprises: pointing the first offset pointer to the first data in the first data group.

3. The method of claim 1, wherein that when the token detects the preset condition, it initializes the first offset pointer specifically comprises, after generating the first dynamic factor, the token determining whether the first dynamic factor is identical to data in a first cache, if no, initializing the first offset pointer;
   after the token initializing the first offset pointer, updating the data in the first cache with the first dynamic factor; and
   initializing the first offset pointer specifically comprises pointing the first offset pointer to a first data in the first data group.

4. The method of claim 1, wherein generating a group of dynamic passwords specifically comprises: invoking the preset algorithm, respectively computing data obtained by combining each dynamic factor in the verification window and respective data in the second data group so as to obtain the group of dynamic passwords.

5. The method of claim 1, further comprises:
invoking the first dynamic factor in the verification window according to a preset order;
combining respective data in the second data group with the invoked dynamic factor orderly, and invoking the preset algorithm to compute respective data obtained by combining to obtain the group of dynamic passwords;
verifying whether a dynamic password, which is identical to the second dynamic password, exists in the group of dynamic passwords, if yes, the verification is successful; otherwise, go to next step; and
determining whether the invoked dynamic factor is the last dynamic factor in the verification window, if yes, the verification is failed; otherwise, invoking a next dynamic factor, then go back to step of combining respective data with the invoked dynamic factor.

6. The method of claim 5, wherein, when a dynamic password, which is identical to the second dynamic password, exists in the group of dynamic passwords, the method further comprises
invoking, by the server, data in the second cache, and comparing the dynamic factor corresponding to the dynamic password which is identical to the second dynamic password with the data in the second cache, if the dynamic factor is more than the data in the second cache, the verification is successful, then go to next step; if the dynamic factor is less than the data in the second cache, the verification is failed; if the dynamic factor is equal to the data in the second cache, go to step of determining;
updating the data in the second cache with the dynamic factor corresponding to the dynamic password which is identical to the second dynamic password, and setting the second offset pointer to point to the data corresponding to the dynamic password, which is identical to the second dynamic password, in the second data group; and
determining whether the data corresponding to the dynamic password which is identical to the second dynamic password is located after the data pointed by the second offset pointer in the second data group, if yes, the verification is successful and setting the second offset pointer to point to the data corresponding to the dynamic password, which is identical to the second dynamic password, in the second data group; otherwise, the verification is failed.

7. The method of claim 1, wherein the method further comprises a step that a token prompts a user to input transaction account number, transaction amount and a challenge code;
before receiving a second dynamic password, the method further comprises a step that the server generates a challenge code;
obtaining the first dynamic password by computing according to the first dynamic factor and the current data specifically comprises:
combining the first dynamic factor, the current data with a token key, the account number, amount and the challenge code of the token input by the user, and computing the data obtained by combination with the preset algorithm so as to obtain the first dynamic password; and
invoking the preset algorithm and generating a group of dynamic passwords by computing according to the dynamic factor in the verification window and respective data of the second data group stored inside the server specifically comprises:
combining in order respective dynamic factors in the verification window with respective data in the second data group, token key, account number and amount input by the user and received by the server, and the challenge code generated by the server, and obtaining a group of dynamic passwords by computing with the preset algorithm according to the respective data obtained by combination.

8. The method of claim 1, wherein generating a group of dynamic passwords specifically comprises
comparing the data in the second cache with the dynamic factor in the verification window; obtaining a dynamic factor, which is equal to or more than the data in the second cache, from the verification window;
combining respective dynamic factors which is more than the data in the second cache with respective data in the second data group respectively and in order, invoking the preset algorithm to perform computing on the data obtained by combining so as to obtain a first part of a dynamic password; combining the dynamic factor of the data in the second cache with respective data, which are located after the data pointed by the second offset pointer, in the second data group; invoking the preset algorithm to perform computing on the respective data obtained by combining so as to obtain a second part of the dynamic password; and
combining the first part of the dynamic password with the second part of the dynamic password so as to obtain a group of dynamic passwords.

9. The method of claim 8, wherein when verifying that a dynamic password which is identical to the second dynamic password exists in the group of dynamic passwords, further comprises
updating the data in the second cache with the dynamic factor corresponding to the dynamic password which is identical to the second dynamic password; and pointing the second offset pointer to the data in the second data group corresponding to the dynamic password which is identical to the second dynamic password.

10. A system for generating and verifying a dynamic password, comprising a token and a server, wherein the token comprises
a first receiving module configured to receive a command for generating dynamic password;
a first generating module configured to generate a first dynamic factor according to time counted by a first timer inside the token when the first receiving module receives the command for generating dynamic password in which generating the first dynamic factor according to time counted by the first timer inside the token specifically comprises: dividing the number of seconds counted by the first timer by a first preset time length and performing a rounding operation on an obtained quotient so as to obtain the first dynamic factor; in which when the token detects a preset condition, it initializes a first offset pointer;
an operating module configured to determine whether the first offset pointer is in an invalid state, if yes, reporting an error; otherwise, keeping on operating; initialize a first offset pointer at intervals of the first preset time length; or initialize the first offset pointer when determining that the first dynamic factor is not identical to the data in the first cache and update the data in the first cache with the first dynamic factor;

a first computing module configured to obtain a current data from a first data group according to the first offset pointer, invoke a preset algorithm and compute according to the first dynamic factor and the current data so as to obtain a first dynamic password;

a first determining module configured to determine whether the current data is the last data in the first data group after the first computing module obtains the first dynamic password by computing; and a setting module configured to point the first offset pointer to the next data of the current data in the first data group when the current data is not the last data or set the first offset pointer as invalid state when the current data is the last data and wait for initializing; and the server comprises a second receiving module configured to receive a second dynamic password input by a user via a host;

a second generating module configured to obtain a second dynamic factor according to time counted by a second timer inside the server; generate a group of dynamic factors according to the second dynamic factor and a verification window value so as to obtain a verification window in which generating the second dynamic factor according to time counted by the second timer inside the server specifically comprises dividing the number of seconds counted by the second timer by the first preset time length and performing a rounding operation on an obtained quotient so as to obtain the second dynamic factor;

a second computing module configured to invoke the preset algorithm and compute according to the dynamic factor in the verification window and the respective data in the second data group stored inside the server so as to generate a group of dynamic passwords; and a verifying module configured to verify whether a dynamic password which is identical to the second dynamic password exists in the first group of dynamic passwords, if yes, the verification is successful; otherwise, the verification is failed wherein the first data group, which is identical to the second data group, comprises: a preset number of data which are in order and are different from each other; the current data is the data which is pointed by the first offset pointer;

wherein the first receiving module, the first generating module, the operating module, the first computing module, the first determining module and the setting module are implemented in a memory and a processor of the token; and wherein the second receiving module, the second generating module, the second computing module and the verifying module are implemented in a memory and a processor of the server.

11. The system of claim 10, wherein the second computing module comprises units stored in a memory to:

invoke the preset algorithm and the first dynamic factor in the verification window;

combine respective dynamic factors in the verification window with respective data in the second data group respectively and orderly; and compute respective data obtained by combining by the first combining unit with the preset algorithm so as to obtain a group of dynamic passwords.

12. The system of claim 10, wherein the second computing module comprises units stored in a memory to:

invoke the preset algorithm and invoke the dynamic factors in the verification window orderly;

combine respective data in the second data group with the invoked dynamic factor; and compute data obtained by combining by the combining unit with the preset algorithm so as to obtain a group of dynamic passwords; and the verifying module comprises units stored in a memory to:

verify whether a dynamic password, which is identical to the second dynamic password, exists in the group of dynamic passwords obtained by computing by the second processing unit; and determine whether the invoked dynamic factor is the last dynamic factor in the verification window when the first verifying unit verifies that no dynamic password, which is identical to the second dynamic password, exists in the group of dynamic passwords; if the current dynamic factor is not the last dynamic factor, invoking the next dynamic factor and the second combining unit starts working.

13. The system of claim 11, wherein the system further comprises a comparing module configured to compare the dynamic factor corresponding to the dynamic password which is identical to the second dynamic password with the data in the second cache when the verifying module verifies that a dynamic password which is identical to the second dynamic password exists in the group of dynamic passwords; if the dynamic factor is more than the data in the second cache, the verification is successful and a first updating module works; if the dynamic factor is less than the data in the second cache, the verification is failed; and if the dynamic factor is equal to the data in the second cache, the second determining module works;

a first updating module configured to update the data in the second cache with the dynamic factor corresponding to the dynamic password which is identical to the second dynamic password and set a second offset pointer to point to the data, which is identical to the second dynamic password, in the second data group; and a second determining module configured to determine whether an order of the data corresponding to the dynamic password, which is identical to the second dynamic password, in the second data group is located behind the data pointed by the second offset pointer, if yes, the verification is successful and set the second offset pointer to point to the data corresponding to the dynamic password, which is identical to the second dynamic password, in the second data group; otherwise, the verification is failed;

wherein the comparing module, the first updating module and the second determining module are implemented in a memory and a processor of the server.

14. The system of claim 12, wherein the system further comprises a comparing module configured to compare the dynamic factor corresponding to the dynamic password, which is identical to the second dynamic password, with the data in the second cache when the verifying module verifies that a dynamic password, which is identical to the second dynamic password, exists in the group of dynamic passwords, if the dynamic factor is more than the data in the second cache, the verification is successful and the first updating module works; if the dynamic factor is less than the data in the second cache, the verification is failed; and if the dynamic factor is equal to the data in the second cache, the second determining module works;

a updating module configured to update the data in the second cache with the dynamic factor corresponding to the dynamic password which is identical to the second dynamic password and set the second offset pointer to point to data corresponding to the dynamic password, which is identical to the second dynamic password, in the second data group; and a second determining module configured to determine whether an order of the data corresponding to the dynamic password, which is identical to the second dynamic password, in the second data group is located behind the data pointed by the second offset pointer, if yes, the verification is successful and set the second offset pointer to the data corresponding to the dynamic password, which is identical to the second dynamic password, in the second data group, in the second data group; otherwise, the verification is failed;

wherein the comparing module, the first updating module and the second determining module are implemented in a memory and a processor of the server.

15. The system of claim 10, wherein the second computing module comprises units stored in a memory to:

find the dynamic factor which is equal to or more than the data in the second cache in the verification window;

combine the dynamic factor which is more than the data in second cache with respective data in the second data group orderly and respectively, invoke the preset algorithm to compute the data obtained by combining so as to obtain a first part of a dynamic password; combine the dynamic factor, which is equal to the data in the second cache, with respective data located after the data to which is pointed by the second offset pointer in the second data group respectively, invoke the preset algorithm and compute respective data obtained by combining so as to obtain a second part of the dynamic password; and combine the first part of the dynamic password and the second part of the dynamic password so as to obtain the group of dynamic passwords.

16. The system of claim 15, wherein the system further comprises a second updating module configured to, when the verifying module verifies that a dynamic password, which is identical to the second dynamic password, exists in the group of dynamic password, update the data in the second cache with the dynamic factor corresponding to the dynamic password which is identical to the second dynamic password, point the second offset pointer to the data in the second data group corresponding to the dynamic password which is identical to the second dynamic password;

wherein the second updating module is implemented in a memory and a processor of the server.

17. The system of claim 10, wherein the first receiving module further configured to receive data which is input into the token by the user;

the second receiving module further configured to receive data which is input into the server by the user via the host; and the second generating module configured to generate the challenge code.

18. The system of claim 17, wherein the first computing module comprises units stored in a memory to:

combine the first dynamic factor, the current data, the token key with the data of the token input by a user; and invoke the preset algorithm to compute the data obtained by combining by the third combining unit so as to obtain the first dynamic password.

* * * * *